(12) United States Patent
Murphy

(10) Patent No.: US 8,484,701 B2
(45) Date of Patent: Jul. 9, 2013

(54) METHODS FOR INTERNET SECURITY VIA MULTIPLE USER AUTHORIZATION IN VIRTUAL SOFTWARE

(76) Inventor: Christopher Murphy, Louisville, KY (US)

( * ) Notice: Subject to any disclaimer, the term of this patent is extended or adjusted under 35 U.S.C. 154(b) by 73 days.

(21) Appl. No.: 13/283,736

(22) Filed: Oct. 28, 2011

(65) Prior Publication Data

US 2012/0110649 A1 May 3, 2012

Related U.S. Application Data

(63) Continuation-in-part of application No. 12/079,728, filed on Mar. 28, 2008, now Pat. No. 8,074,261.

(60) Provisional application No. 60/920,613, filed on Mar. 29, 2007.

(51) Int. Cl.
*G06F 21/00* (2006.01)

(52) U.S. Cl.
USPC .............................................. 726/3; 705/70

(58) Field of Classification Search
USPC ............................................... 726/3; 705/70
See application file for complete search history.

(56) References Cited

U.S. PATENT DOCUMENTS

| 5,940,074 | A | 8/1999 | Britt, |
| 6,345,361 | B1 | 2/2002 | Jerger |
| 6,351,810 | B2 | 2/2002 | Gupta |
| 6,799,177 | B1 | 9/2004 | Fai |
| 7,133,845 | B1 | 11/2006 | Ginter |
| 7,366,703 | B2 | 4/2008 | Gray |
| 7,634,661 | B2 | 12/2009 | England |
| 8,074,261 | B2 * | 12/2011 | Murphy ............................ 726/3 |
| 2006/0200681 | A1 | 9/2006 | Kato |
| 2007/0101418 | A1 * | 5/2007 | Wood et al. ....................... 726/8 |
| 2008/0109306 | A1 * | 5/2008 | Maigret et al. ................... 705/14 |

FOREIGN PATENT DOCUMENTS

| CN | 1811810 | 8/2006 |
| DE | 10220460 | 11/2003 |
| EP | 1439447 | 7/2004 |
| EP | 1684229 | 7/2006 |

* cited by examiner

*Primary Examiner* — Matthew Smithers
(74) *Attorney, Agent, or Firm* — Cooper & Dunham LLP

(57) ABSTRACT

A method for providing internet security via multiple user authorization in virtual software. Each of two users are provided with a non-transitory tangible storage medium. The first user inputs the storage medium into a local computer. If the first user is granted authorization by a second user, the first user can download at least one additional non-browser based application module into virtual memory of his local computer.

10 Claims, 13 Drawing Sheets

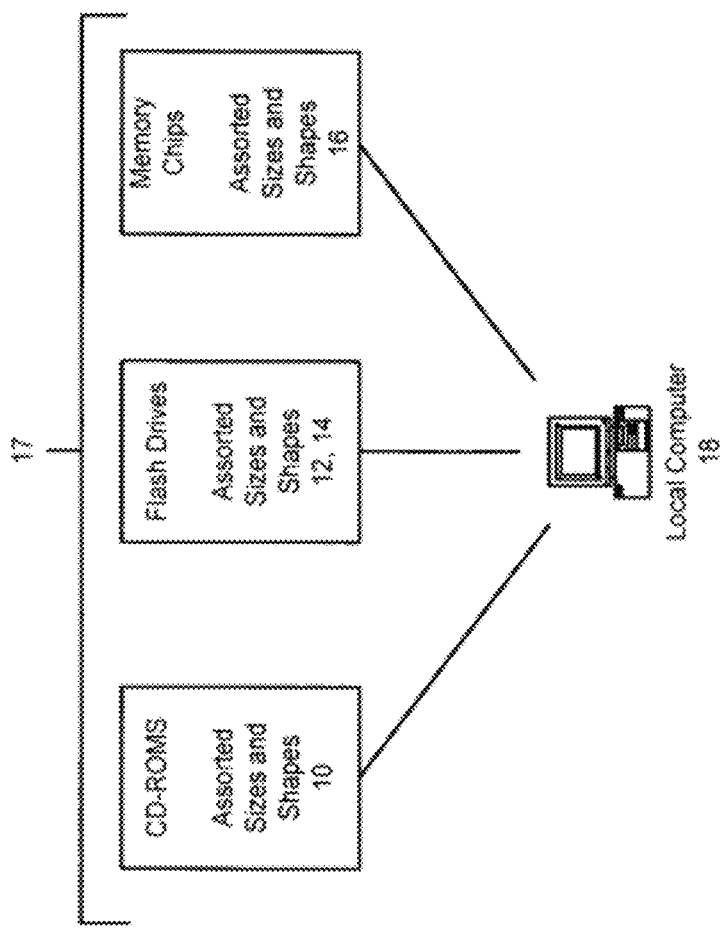

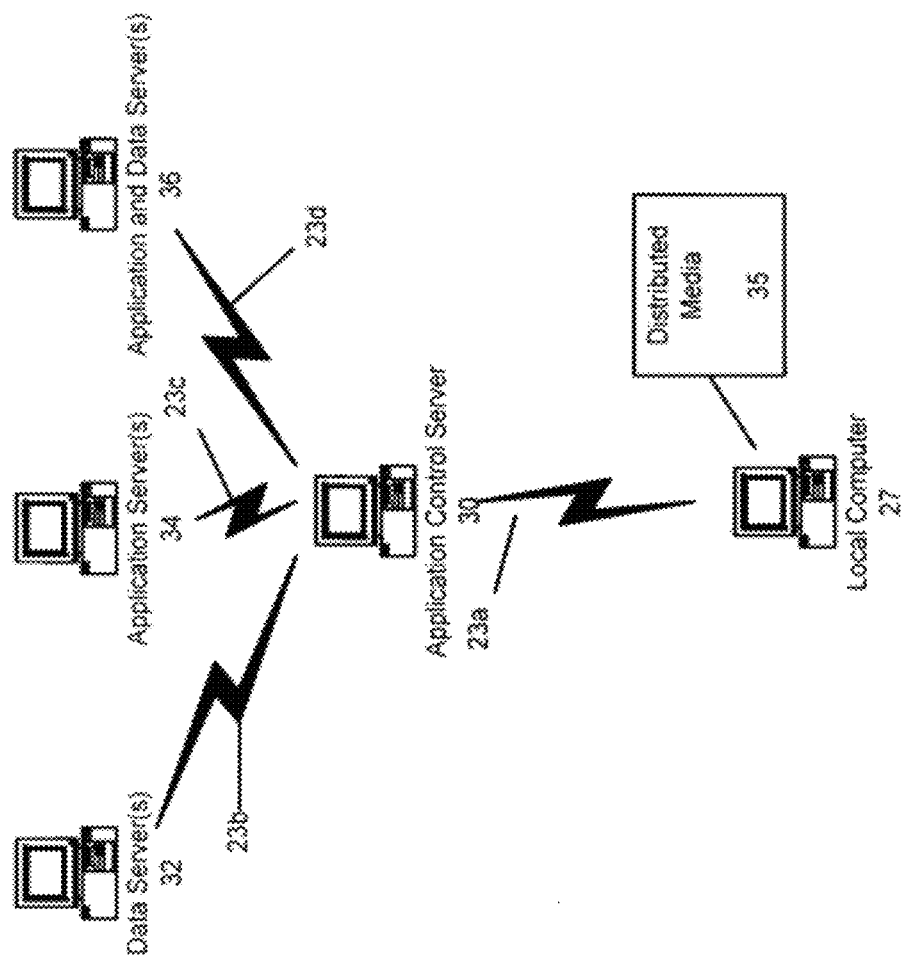

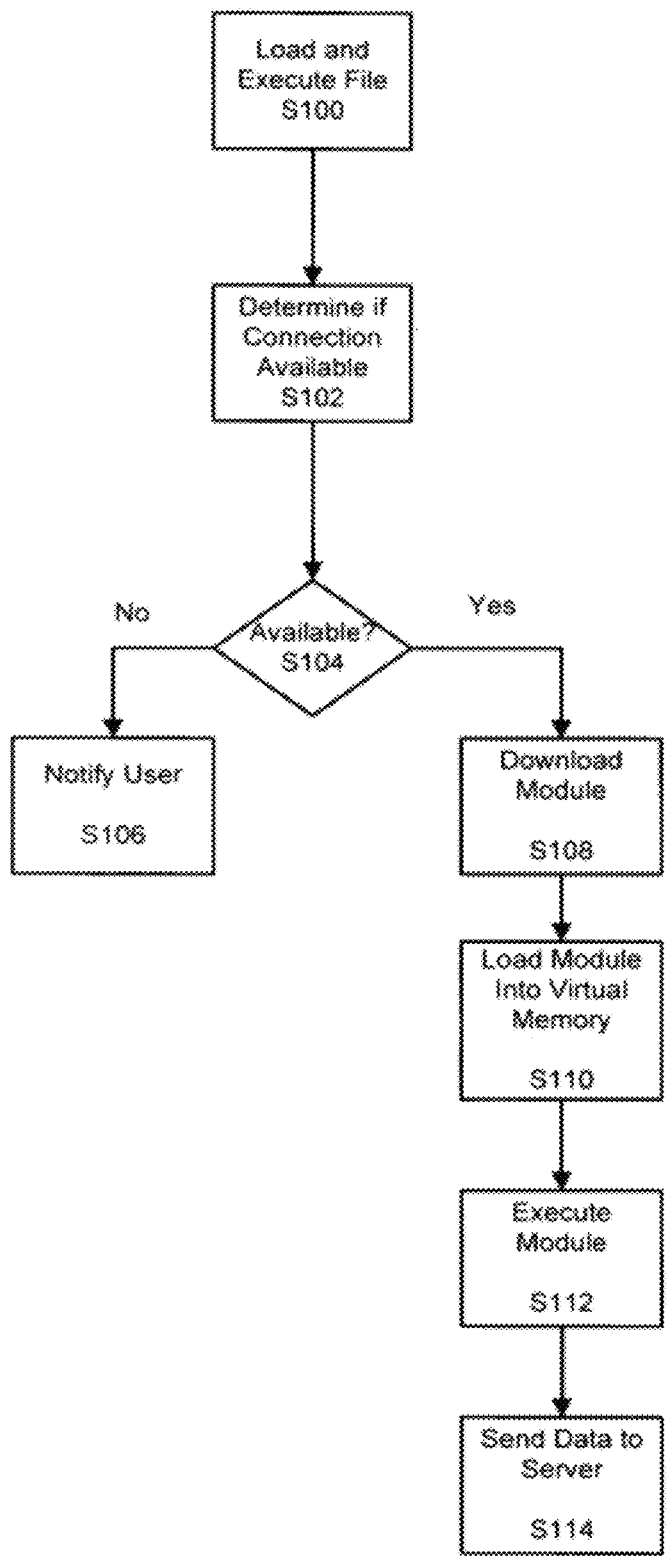

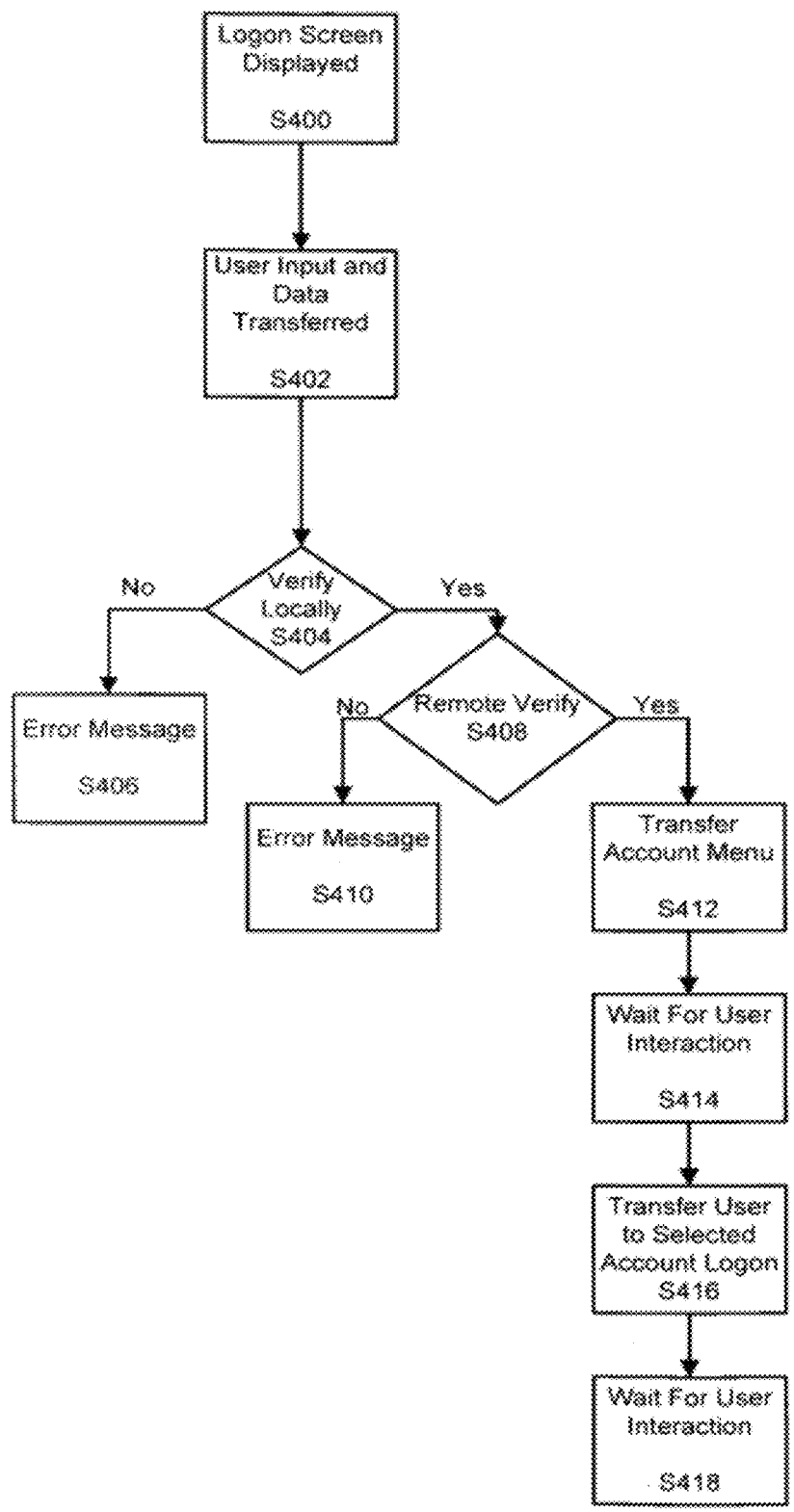

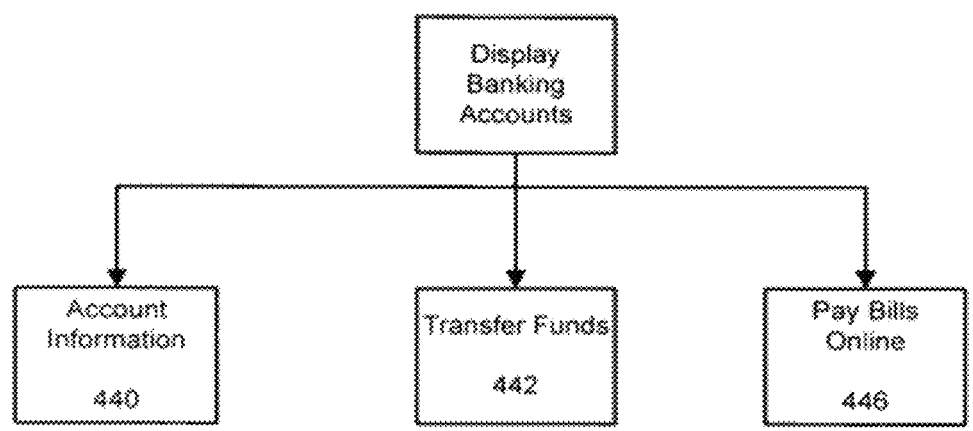

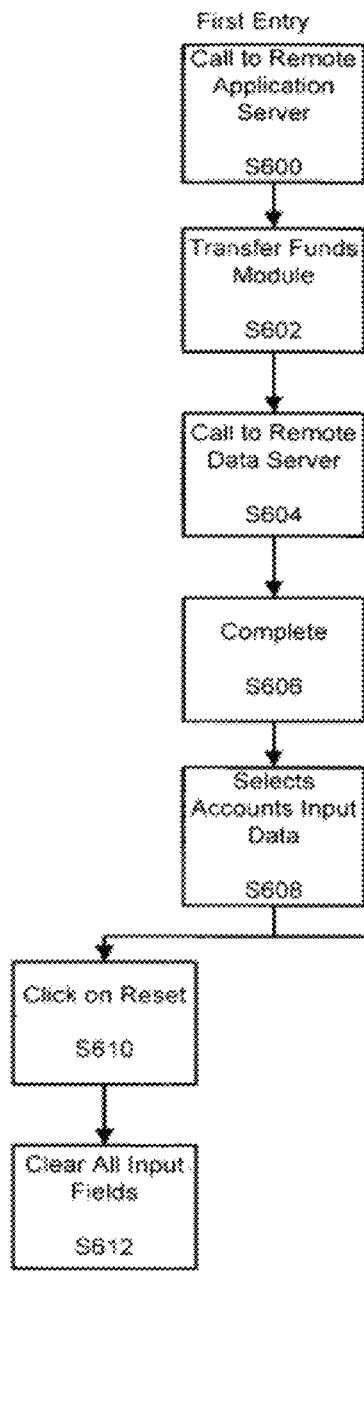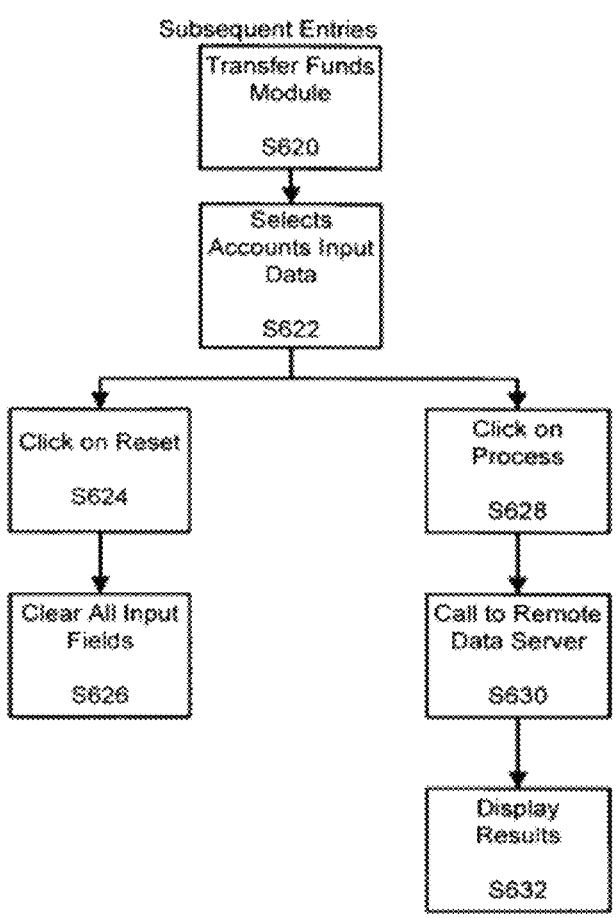
FIGURE 11A
First Entry
FIGURE 11B
Subsequent Entries

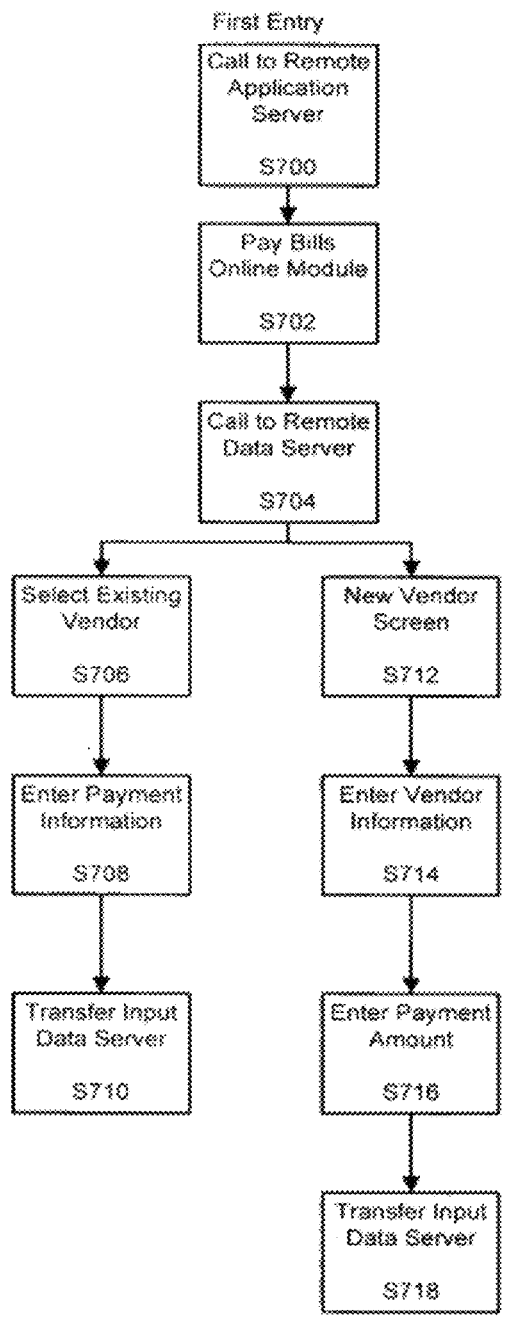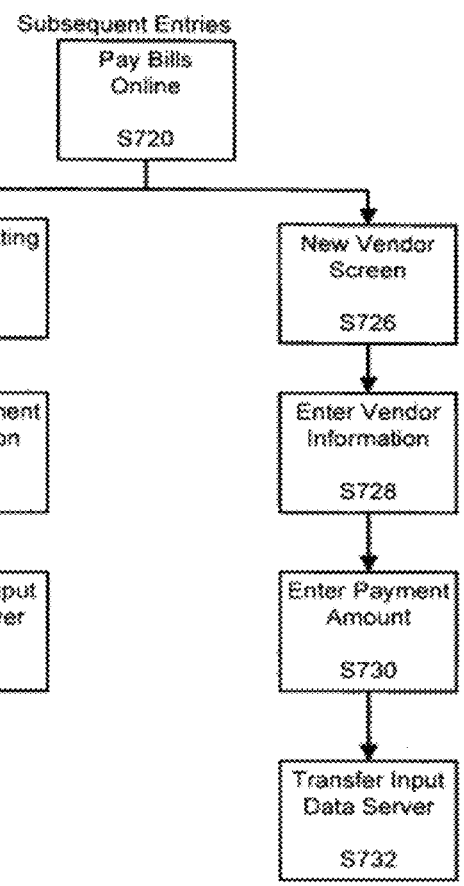
FIGURE 12A First Entry
FIGURE 12B Subsequent Entries

METHODS FOR INTERNET SECURITY VIA MULTIPLE USER AUTHORIZATION IN VIRTUAL SOFTWARE

CROSS-REFERENCE TO RELATED APPLICATIONS

This application is a Continuation in Part of U.S. patent application Ser. No. 12/079,728, filed Mar. 28, 2008, the entire contents of which are herein incorporated by reference, which is based on and claims the benefit of U.S. Provisional Application Ser. No. 60/920,613, filed Mar. 29, 2007, the entire contents of which are herein incorporated by reference.

FIELD OF THE DISCLOSURE

The present invention relates to Internet security and, in particular, to methods for multiple user authorization in virtual software.

DESCRIPTION OF THE BACKGROUND ART

Internet security is in a constant state of change. New encryption models are created, tokens placed on computers or even on distributed mediums are in circulation. The Internet security industry is always trying, often without success, to stay one step ahead of those individuals that would like to circumvent an organizations right to maintain the privacy of their data.

Organizations such as financial, medical, insurance, industrial, architectural, governmental, etc. organizations, currently utilize internet security methods that contain the same inherent weaknesses. For example, most present Internet security methods utilize a logon process that is available online to anyone utilizing the Internet. Upon visiting a website, the user is often presented with an option to "Sign On" by entering information that may include a User ID and a Password. After entering the correct information, the user is presented with one or more browser based online applications. For example, in the banking industry, the user can be offered an option to examine or work with their checking account, savings account, credit cards, etc. However, such freely available and open access to an organization's logon screen and online applications is an invitation to those individuals intent on hacking into the system either just for the challenge of doing so or for more ominous reasons.

As long as an individual with access to a computer and an active Internet connection can visit a website, logon and then be granted use of browser based applications for accessing secure data, the current Internet security models will inevitably fail. In addition to the weaknesses associated with current logon processes, even after a user has successfully logged on to an organization's website, processes associated with data access provided by the browser based online applications present additional weaknesses.

Embodiments of the present disclosure address the weaknesses other security models miss, fail to understand or just ignore. Through the implementation of embodiments of the present disclosure, an organization can not only remove the logon process from their website, but can also remove the entire browser based online process currently employed to read, write or update data.

For example, a bank can remove all screens and processes that allow online banking from their website and still permit their customer online banking privileges through the use of embodiments of the present disclosure. By taking this action the bank can provide a high level of protection to both their customers and themselves.

Effectively, in an environment where the surface area of attacks on secure public servers is the entire Internet, there is a need to limit the attack surface. The difficulty is that secure services and data must be available for public access and yet must use the Internet to deliver content to transient individuals. Virtual software applications, initiated through the use of a serialized distributed medium, as described herein, limits this attack surface to a controlled, easily identifiable group. By limiting access to applications and data to virtual software applications, there is no need to install software or store data on a local computer, no software or data is stored on a distributable medium, and no software or data is available from a browser-based environment.

Moreover, in secured environments, there are times and there is data that no single individual should have a right to access. The embodiments of the present disclosure address that weakness by providing a method wherein in order to access secure data, two or more users are required to access the virtual software application and then through that application, access the secure data.

BRIEF SUMMARY OF THE INVENTION

The present disclosure describes tools (in the form of methodologies, apparatuses, and systems) for Internet security. The tools may be embodied in one or more computer programs stored on a computer readable medium or program storage device and/or transmitted in the form of a computer data signal in one or more segments via a computer network or other transmission medium.

The present invention described herein relates to multiple-user authorization of virtual software applications. The invention applies to areas of security where no single user is allowed to open the application or view the secured data.

The method for internet security via multiple user authorization through virtual software applications may require both users to be logged on to the application at the same time and upon exiting of either user, the other user is automatically logged off. The method may also include the ability for an authorizer to approve logon into an application and then release control to the other authorized user without the necessity for both users to remain active. The method may require both users to be in the same location or may allow for users located in different location, or any combination of the above.

A method for providing internet security via multiple user authorization includes providing each of two users with a non-transitory tangible storage medium including a non-browser based access application module for providing access to at least one remote server. In response to a first user inputting the non-transitory tangible storage medium onto a local computer, a non-browser based access application module is loaded into virtual memory, the non-browser based access application module is executed and a remote non-browser based access module is downloaded from the at least one remote server. The remote non-browser based access module is then loaded into virtual memory on the local computer and an access screen is provided on the local computer to the first user. The access screen prompts the first user to input remote logon data for access to at least one remote data server. Remote logon data is input. If the first user's remote logon data is valid, the application waits for a second user to input the second user's non-transitory tangible storage medium into a local computer and for validation of the second user's remote logon data. If the second user's remote logon data is valid, it waits for the second user to grant authorization to the first user to access the remaining non-browser based application modules. If authorization is granted, at least one additional non-browser based application module is loaded into virtual memory of the first user's local computer. The additional non-browser based application module is executed and displays at least one of a data display screen and navigation screen to the first user.

In one embodiment of the invention, if authorization to the first user is granted, the additional non-browser based application module is loaded into virtual memory of each of the first user and the second user's local computers.

In a further embodiment of the invention, if either the first user or the second user exits the additional non-browser based application module, the other user is automatically exited from the application.

In one embodiment of the invention, the non-transitory tangible storage medium is provided to any number of additional users. In a further embodiment, authorization of the first user may be granted by any of the additional users. In a further embodiment, the first user may select from a list of the second user and any of the additional users to grant authorization.

A distributed non-transitory tangible recording medium includes computer executable code for providing secure access to at least one remote server providing application modules and data, the distributed non-transitory tangible recording medium including a first computer executable non-browser based access application module comprising code for loading the first computer executable non-browser based access application module into virtual memory on a local computer in response to a user inputting the non-transitory tangible storage medium onto a local computer, code for accessing at least one remote server at a predetermined URL, code for requesting that at least one remote server at the predetermined URL download at least one of a second executable remote non-browser based application module and data to the local computer, code for loading the at least one of the second executable remote non-browser based application module and data into virtual memory on the local computer, and code for confirming authorization of the first user by a second user and loading the at least one additional non-browser based application module and data into virtual memory on the local computer.

The distributed non-transitory tangible recording medium may comprise at least one of a CD-ROM, flash drive, memory chip, and flash memory.

The distributed non-transitory tangible recording medium may comprise at least one of a magnetically and optically recorded medium.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 illustrates distributed media interaction with the local computer;

FIG. 4 illustrates a local computer accessing an application control server. The application control server directs the connection from the local computer to access the application modules from one or more remote server(s) and to access data from one or more remote server(s);

FIG. 5 illustrates a process for a single and multiple server virtual software application;

FIGS. 8-12 illustrate flow charts for describing various embodiments of the present disclosure.

DETAILED DESCRIPTION OF THE INVENTION

Figure 3:
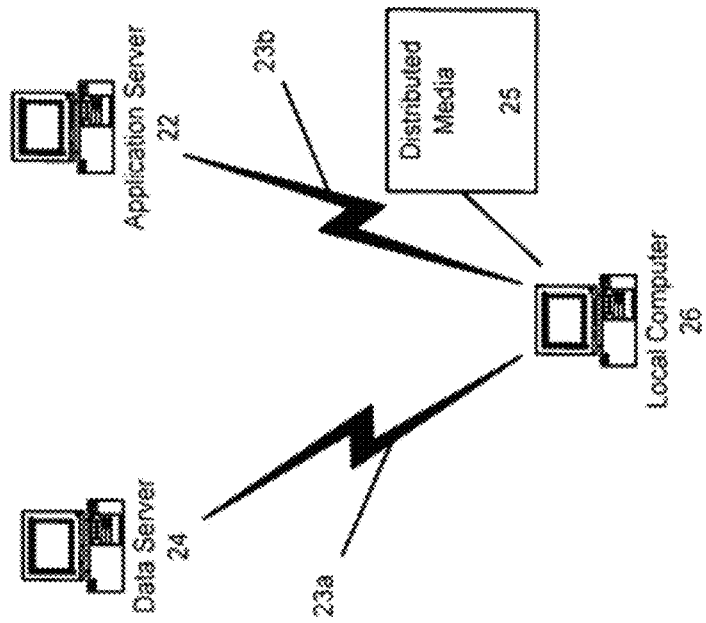
FIG. 3 illustrates a local computer accessing application modules from one remote server(s) and accessing data from a different remote server(s)

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Embodiments of the present disclosure are based on object-oriented programming and, as such, descriptions of the various embodiments will follow a logical developmental process, most logical application flow and will branch to process at the point that the process becomes available. The descriptions of various embodiments of the present disclosure do not necessarily describe a single application but rather the logical application of embodiments on at least one software application.

It should be understood that embodiments of the present disclosure may be applied to numerous types of organizations based on the individual needs of each organization. The present disclosure identifies several different types of organizations for which embodiments of the present disclosure can be applied. Of course, the present disclosure is not limited to the disclosed embodiments. The present disclosure will briefly describe several applications to provide an understanding of the scope to which embodiments of the present disclosure can be applied.

Internet Security Via Virtual Software

According to an embodiment of the present disclosure, Internet security is provided through the use of virtual software applications in place of browser based online services. According to this embodiment, at least one virtual software application on some type of distributed medium is initially supplied to a user. Non-limiting examples of types of distributed media that can be utilized include CD-ROM, Flash Drive, Memory Chip, Flash Memory or any other type recording medium including, but not limited to magnetically or optically recorded media.

The user places the distributed medium in a drive or plugs the medium into an access port, for example a USB port, of a computer or workstation. When the user places the distributed medium into the computer or workstation, the software application is constructed in virtual memory (e.g., in RAM) and initiated automatically or on demand of the user. The user then utilizes a human interface device such as a mouse, keyboard, etc. to interact with the software application.

According to another embodiment of the present disclosure, the software application modules on the distributed medium can limit the sections of the software available to the user, using additional security parameters provided during "Logon". In this way, the user will only gain access to software modules at the remote server for which they are authorized. For example, in industrial security, a company can provide different authorization parameters for different groups of individuals, each group having a different level of access clearance. According to various aspects of the present disclosure, although each group will gain access to online information, each individual will only have access to the software modules and data associated with their level of access clearance. For example, a company may find it necessary to share sensitive information between different groups internally and/or with external sub-contractors. When a user inserts their distributed medium into a local computer, the remote server may be accessed by logging on with a User Name and Password and encrypted code or Key associated with the distributed medium. According to an embodiment of the present disclosure, additional levels of security access may be provided after the logon so that each user will only have access to information for which they are authorized.

According to various embodiments of the present disclosure, the encrypted code or Key on the distributed medium assigns the medium to a single user. This security code can be of varying lengths and can contain both numbers and letters. The security code format may vary, based on the application being designed and the needs of the organization creating the virtual software application. The security code may or may not be encrypted.

Using an access control module and/or Key provided on the distributable medium, instead of utilizing a browser based online process such as that utilized previously, an authorized individual can have the online process constructed as a virtual software application in Random Access Memory (RAM). Using this virtual application the user can then gain access to the online database to query, display and manipulate data.

The application modules used by the present disclosure can employ encryption to provide additional security for the data being transferred. For purposes of describing embodiments of the present disclosure, particular encryption systems are not described in detail. However, it will be appreciated that any suitable type of encryption system may be utilized for implementing embodiments of the present disclosure. According to embodiments of the present disclosure, the encryption methods may be written into the virtual software or can be layered over the data transfer process based on each individual application's requirements.

Embodiments of the present disclosure will be described by reference to the banking industry. Utilizing previous processes, any Internet user could visit a bank website, enter a valid User Name and Password and then gain access to the associated individual's bank accounts. This is true whether the individual entering the User Name and Password is the authorized user or some individual who gained access to this information in a deceitful manner.

In order to avoid unauthorized access, according to an embodiment of the present disclosure, the bank can remove the logon process from their website. The bank can even remove all other online processing screens from their website. According to this embodiment of the present disclosure, the bank would then distribute a medium such as a flash drive to their consumers.

The banking consumer uses the distributed medium on a local computer to initiate the online banking process. The process of initiation of the online banking processes will be described later below. Of course, the present disclosure is not limited to any particular type of industry.

For example, embodiments of the present disclosure may also be readily applied to the securities industry (stocks, bonds, etc.). Again utilizing presently available online systems and methodologies, any individual with a correct User Name, Password and an internet connection can gain access to an individual's securities account and perform trades and transfer funds.

Embodiments of the present disclosure as they relate to the securities industry are similar to the banking model mentioned above with the only difference being that the software application is designed to perform financial security transactions.

Virtually any online system is vulnerable to violation by unauthorized users with simple knowledge of a User Name and Password. Embodiments of the present disclosure can be utilized to minimize or eliminate such unauthorized access.

According to embodiments of the present disclosure relating to the industrial security type systems, one or more logon processes, some utilizing User Name and Password may be used. In addition, various other processes may also be performed. In particular, according to this embodiment, after the user logon is complete, processes are provided so that only services that have been authorized for the user are transferred to the local computer. According to this embodiment, the present system will allow the virtual software to only download and load into RAM sections of the software that are associated with the user's account. Thus the software is protected from unauthorized distribution or access.

FIG. 1 depicts examples of the various types of distributed medium 17 that may be used for implementing aspects of the present disclosure. For example, the distributed medium 17 may be in the form of CD-ROM 10, Flash Drive 12, 14, Memory Chip 16, Flash Memory or any other type recording medium including, but not limited to magnetically or optically recorded medium. The information on the distributed medium is accessible by a local computer 18. The local computer 18 may be, for example, a desktop or laptop personal computer or may be any other type of interface device including but not limited to PDA's, Cellular Phones, Gaming platforms or any other device that contains the capacity to read a distributed medium in its many forms, connects to the Internet via wired or wireless technology, allows interaction between the human and the device, the device and remote server(s) and allows two-way communication.

Embodiments of the present disclosure can take numerous forms, only a few of which are described herein. The descriptions of the models described below are not intended to limit the application of embodiments of the present disclosure but rather to show the flexibility of the present disclosure. The following is a brief overview of the types of systems that can be utilized for implementing embodiments of the present disclosure.

Figure 2:
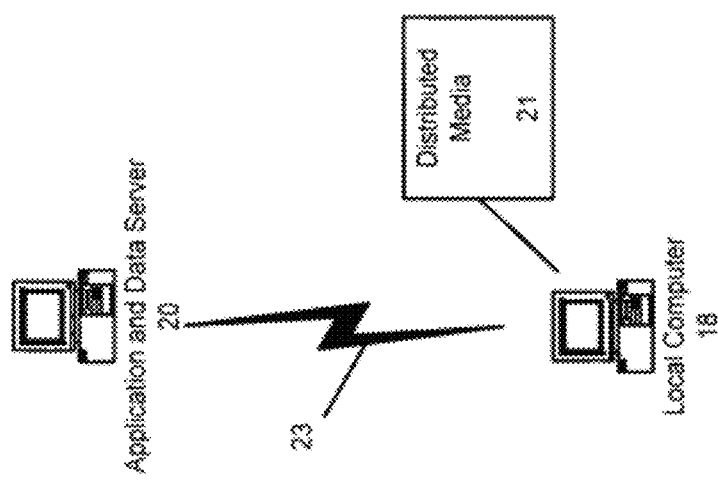
FIG. 2 illustrates a local computer accessing both application modules and data from a single remoter server.

According to an embodiment of the present disclosure as shown in FIG. 2, a distributed medium 21 is placed into a local computer 18. An application module on the distributed medium 21 is loaded into virtual memory in local computer 18. The application module then makes calls to a single remote server URL 20, which serves as an application server and a database server.

According to another embodiment of the present disclosure as shown in FIG. 3, a distributed medium 25 is placed in local computer 26. An application module on the distributed medium 25 is moved into virtual memory on local computer 26 and executed. Utilizing an active Internet connection, the application module calls to remote application server URL 22, which serves as an application server. The application module also uses an active Internet connection to access remote data server URL 24, to access data. The two servers (22, 24) can be hosted as part of the same URL or can be on two completely different URLs.

Yet another embodiment of the present disclosure is shown in FIG. 4. The distributed medium 35 is placed into a local computer 27. An application module on the distributed medium 35 is moved into virtual memory on local computer 27 and executed. Utilizing an active Internet connection, the application module calls to a remote application server URL 30, which serves as an application control server. The application control server 30 downloads an application association module to local computer 27 which is also loaded into virtual memory on local computer 27. When executed, the application association module then provides a list of virtual software applications available to the consumer. According to an embodiment of the present disclosure, upon selection of the service the consumer wishes to use, the local computer 27 makes a call to application control server 30. Application control server 30 then finds the appropriate applications and or data for the selected service on one or more of servers 32-36. Application control server 30 retrieves the data/application from the server(s) 32-36 and downloads it to local computer 27. Local computer 27 places the data/application in virtual memory and executes the application. An example of the use of the application control server according to this embodiment would be when using one distributed medium to access banking services at multiple banks, financial services, stock trading, at one or more brokerage firms and to track insurance processing of bills for drugs or services. This application server model will allow the consumer to use one medium to access several online services, rather than needing a unique distributed medium for each process.

In the three embodiments described above, if current browser based systems were utilized, the weak point in the security process would be the individual and their ability to keep their User Name and Password secure. Lapses in security often happen in this area for reasons as simple as being away from the office, needing data and asking an assistant to provide it. The assistant is trusted? So there is no harm in telling them your User Name and Password this once. Although this scenario may seem unlikely, it happens quite often. Users also often write down their User Name and Password which can enable the information to be used if it is lost or stolen.

The construction of better encryption, tokens, or other security devices will not eliminate the ability for a user to compromise security by leaking a User Name and Password. Embodiments of the present disclosure are designed to resolve the weakness inherent in the current Internet model.

Embodiments of the present disclosure remove the online processes from the current browser based delivery process, thus eliminating the ability of a non-authorized user from accessing privileged information by simply going to a website.

In addition, according to an embodiment of the present disclosure, each distributed medium can be serialized with a unique key that can then be matched to the User Name and Password for the authorized individual. These embodiments thus prevent other authorized users of an organization from accessing the online process of another authorized user without their medium. The only individual that can access the online processing is the person to which the medium was assigned.

Embodiments of the present disclosure describe user input/selection. For example, certain embodiments of the present disclosure describe application modules being downloaded into a virtual environment based on user input or interaction. It will be appreciated that in these instances where user input is required, the user is generally prompted on the local computers display to click certain buttons and/or enter information in associated boxes being displayed.

The following is a more detailed description of examples of the various types of systems contemplated by the present disclosure. Of course, the claims are not limited to the disclosed embodiments.

Returning to FIG. 2, and referring to FIG. 5, a single server type system according to an embodiment of the present disclosure will be described. When a user inserts distributed medium 21 into local computer 18, local computer 18 reads the execution file on the distributed medium 21 and loads it into virtual memory (RAM) and executes the execution file (Step S100). The execution file can be executed automatically using an auto-run process or on demand by the user. A determination is made whether an active internet connection is available (Step S102). If not available, (No, Step S104) the user is notified (Step S106). If available (Yes, Step S104), local computer 18 connects with remote application and data server 20 via an active Internet connection 23. That is, the execution file instructs local computer 18 to connect to remote server 20 at a specified URL and to download one or more specified software application modules and data from the server 20 and to display the data (Step S108). The application module(s) and/or data are then loaded into virtual memory (Step S110) in local computer 18 (e.g., into RAM). The application module(s) are then executed either based on user interaction (Step S112). The data downloaded from remote server 20 and appropriate to the application module is also loaded into RAM and displayed on local computer 18. If the user interacts with the data displayed on local computer 18 and the changes need to be saved, the data is then sent back to the remote server 20 for processing and storage (Step S114).

Figure 6:
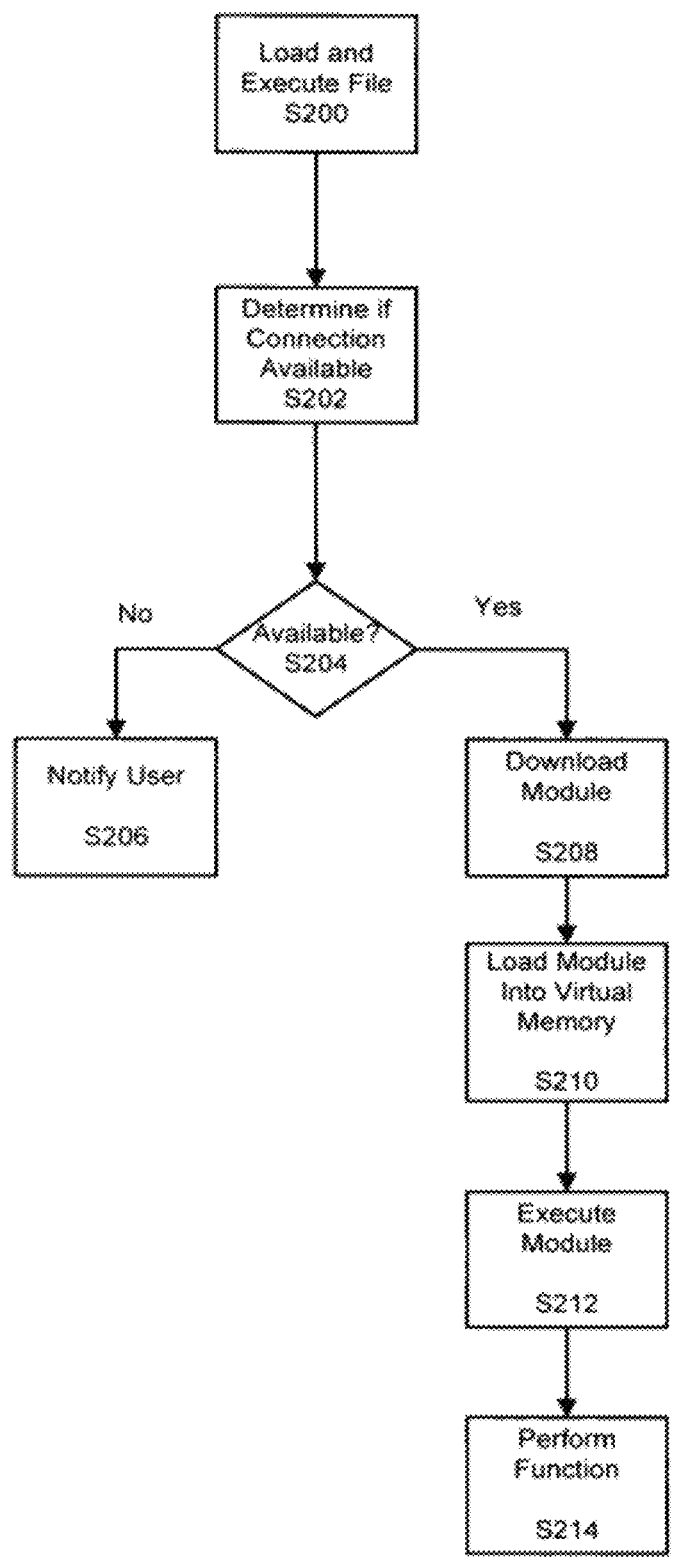
FIG. 6 illustrates a process for an application server model according to embodiments of the present disclosure.

A dual server type system according to an embodiment of the present disclosure will now be described by reference to FIGS. 3 and 6. According to this embodiment, the application server 22 and the data server 24 are provided on separate systems. Local computer 26 has active Internet connection 23a, 23b with data server 24 and application server 22, respectively. The connections may be, for example, via the World Wide Web (WWW). According to this embodiment, when a user inserts distributed medium 25 into local computer 26, local computer 26 loads the execution file from distributed medium 25 into virtual memory and executes it either automatically using an auto-run process or in response to user demand (Step S200). A determination is made whether an active internet connection is available (Step S202). If not available (No, Step S204), the user is notified (Step S206). If a connection is available (Yes, Step S204), the execution file instructs local computer 26 to connect to remote application server 22 at a specified URL and to download one or more specified software application modules from the application server 22 (Step S208). The one or more specified software application modules are loaded into virtual memory (e.g., RAM) on local computer 26 (Step S210) and executed (Step S212). Based on the application module loaded in RAM, local computer 26 can perform one or more functions (Step S214). For example, in response to a user input, the application module may instruct local computer 26 to send queries to data server 24 for verification or to download data for display on local computer 26. Downloaded data is placed into virtual memory on local computer 26. The application module may also instruct local computer 26 to download additional application modules from the application server 22. Any additionally downloaded application modules are also loaded and run from virtual memory in local computer 26. In this case, if data is manipulated or new data input by the user at local computer 26, the manipulated and/or new data is then sent to the data server 24 for processing and storage.

Figure 7:
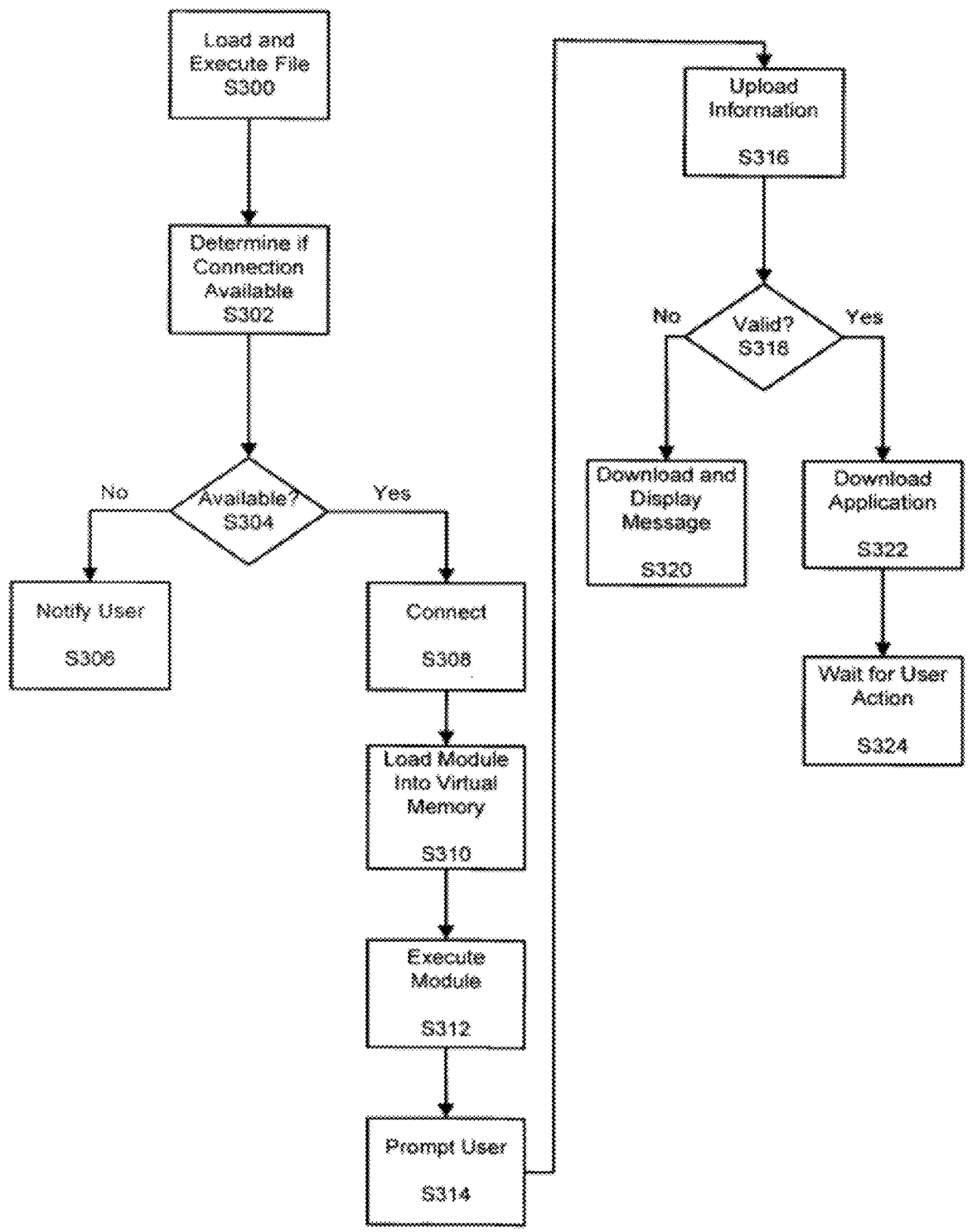
FIG. 7 illustrates a process for an application server model according to embodiments of the present disclosure.

A multiple application distributed medium type system according to an embodiment of the present disclosure will now be described by reference to FIGS. 4 and 7 According to this embodiment, the data server 32, application server 34 and application/data server 36 are provided on separate systems. Local computer 27 is capable of providing an active Internet connection 23 with an application control server 30 which itself is capable of providing active Internet connections 23b-23d with servers 32-36 as shown. The active Internet connections may be, for example, via the World Wide Web (WWW). According to this embodiment, when a user inserts distributed medium 35 into local computer 27, local computer 27 loads the execution file from distributed medium 35 into virtual memory and executes it either automatically using an auto-run process or in response to user demand (Step S300). A determination is made whether an active internet connection is available (Step S302). If not available (No, Step S304), the user is notified (Step S306). If a connection is available (Yes, Step S304), the execution file instructs local computer 27 to connect to remote application control server 30 at a specified URL (Step S308) and to download one or more specified software application modules from the application control server 30 (Step S310). For example, application control server 30 may download a remote logon screen module to local computer 27. Local computer 27 places the remote logon screen module into virtual memory and executes the module either automatically or in response to user demand (Step S312).

The user of local computer 27 is prompted via the displayed remote logon screen to provide a remote USER ID and Password for access to application control server 30 (Step S314). The USER ID and Password are uploaded (Step S316) to application control server 30. If the remote logon data is invalid (No, Step S318), application control server 30 downloads an indication to local computer 27 and an error message is displayed (Step S320) on local computer 27. If the remote logon data is valid (Yes, Step S318), application control server 30 downloads an indication to local computer 27 along with an application such as, for example, a main menu which is downloaded from application control server 30 into virtual memory (e.g., RAM) in local computer 27 (Step S322) and the system then waits for additional user interaction (Step S324). Alternatively or in addition, the application control server 30 may return an application display module which will be loaded into a virtual environment (e.g., RAM) in local computer 27 along with data to be displayed on local computer 27. For example, the data displayed may consist of the accounts that are associated with the distributed medium 35. This application display module allows the user of local computer 27 to select the account they wish to access and then directs application control server to connect with the server(s) (e.g., data server(s) 32, application server(s) 34 and/or application and data server 36) associated with the selected account. Depending on the system, the user may then need to navigate any security logon related to the selected account.

As noted above, when the remote logon is attempted the user inputs their User Name and Password then clicks a button to transfer the data. According to an embodiment of the present disclosure, the encrypted ID uniquely identifying the distributed medium is sent with the logon data. If the application finds that the local computer 18, 26 or 27 has lost connection with the Internet, an error message is displayed, otherwise the User Name, Password and encrypted ID are sent to the remote server (e.g. application and data server 20, data server 24, application control server 30, or one or more of the data and/or application servers 32-36).

The remote server then verifies that all the information passed matches an entry in a database. This is accomplished using any accepted programming norm. For example, this can be performed at the remote server, by querying an ODBC compliant database using the ID, User Name and Password transferred from the local computer 18, 26 or 27. If the record count from the query is greater than zero, the information is a match and access is granted. If the record count from the query is equal to zero, the data transferred from the local computer is not a match.

According to an embodiment of the present disclosure, server 20 (FIG. 2) or servers 22, 24 (FIG. 3) can be provided by an organization such as a bank. In this case, the first screen downloaded to the local computer after logon will usually be a Main Menu which is part of the bank's online processing application. Once the Main Menu is displayed, the local computer waits for user interaction.

Continuing forward with the description of the disclosed embodiments, the descriptions will be in terms of the process without going into the specifics of the code functionality. A programmer versed in the art will be able to understand the processes used and the functions executed and be capable of implementing the processes and functions in view of the present disclosure.

It will be further appreciated that the specifics of any individual application are not critical to the described embodiments of the present disclosure. That is, the specific code used for implementing embodiments of the present disclosure is not critical.

An embodiment of the present disclosure described by reference to FIG. 8 makes use of an online banking model. Of course, it will be appreciated that this embodiment is not intended to limit the present disclosure to banking. Rather, the banking model is being used to describe how processes utilized by embodiments of the present disclosure may be implemented into and used by those types of systems.

Referring to FIG. 8, the user inserts a distributed media 21, 25 or 35 (also see FIGS. 2-4) into local computer 18, 26 or 27 and the executable application from the media 21, 25, or 35 is loaded into virtual memory on local computer 18, 26 or 27. After the user successfully has input data verified locally (e.g. User Name length between 6 and 20 characters and password between 8 and 15 characters in length) (Steps S400-S406) and logs on successfully remotely (Steps 408-S410) as described above, and the remote server has verified that all the information passed matches an entry in the database (Yes, Step S408), the remote application server sends data back to the local computer along with an Account Menu (Step S412). The local computer then waits for the user to select an account for access (Step S414). After the user selects an account, the logon screen for the selected account is loaded (Step S416). This is accomplished by calling the screen from the account's remoter server(s), transferring the logon screen module from the account's remote server(s) to the local computer, placing it in virtual memory and then displaying the logon screen on the local computer. The application then waits for the user to input data and initiate a logon (Step S418). A similar logon process is then performed for the account. After the user has successfully logged onto the account, a Main Menu for the account can be downloaded and displayed on the local computer.

Referring to FIG. 9, after the user has successfully logged on and the Main Menu has been transferred from the remote application server(s) to the local computer for display, the local computer waits for the user to select a process. For example, according to an embodiment of the present disclosure, the processes are broken into small process modules for quick response to the user's processing requests. A process module can consist of a single screen or an entire process. Using a virtual software application such as that displayed in FIG. 9, the application has three major processing functions for the user to select from. A bank employing embodiments of the present disclosure may choose to provide fewer functions or to add additional functions such as insurance information and processing or stock transactions, etc. A virtual software application is limited only by the imagination of the client that is employing the process.

The three major processes employed according to this embodiment of the present disclosure are the user's Account Information 440, Transfer Funds 442 and Online Bill Payment 446. Each of these sections can be constructed of a single process module or multiple process modules. Once the user selects a function and the process module(s) related to the function, the process module(s) are called from the remote server(s), downloaded to the local computer and loaded into the virtual environment (e.g., into RAM of local computer 18) and executed.

The process module(s) are downloaded to the local computer and loaded in the virtual environment once. Any subsequent entries into the function use the process modules, which have been added to the virtual software application on the first request of the user.

Figure 10A:
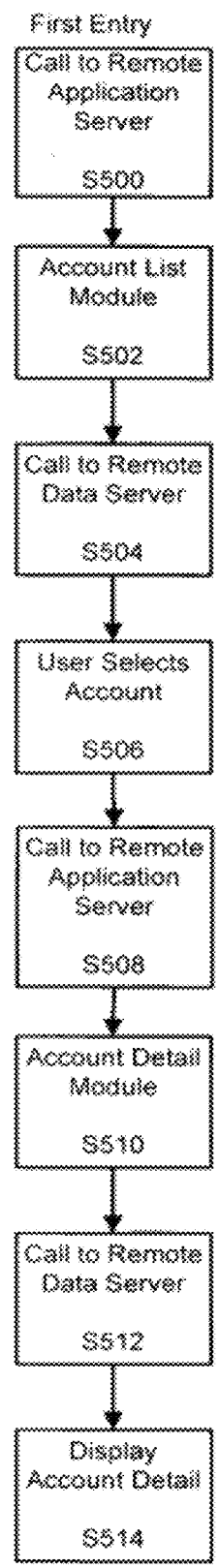
Figure 10B:
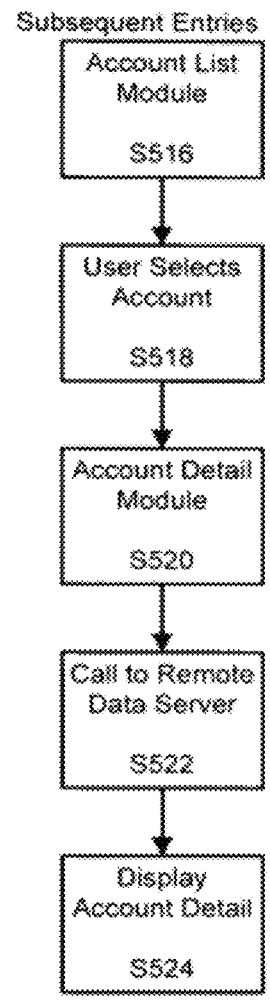

Referring to FIGS. 10A and 10B, it is assumed that the user selected the Account Information 440 that was identified in FIG. 9. In this case, a call is made to the remote application server(s) (Step S500) and the Account List Module is downloaded and loaded into the virtual environment (e.g., Ram in local computer 18). Upon completion of the loading of the Account List Module (Step S502), a call is made to the remote data server(s), a query is performed at the remote data server, and the list of accounts are downloaded into the Account List Module and displayed (Step S504). According to this embodiment of the present disclosure, the Account List Module consists of only a screen to display the list of accounts available to the user with their account balances, key and foreign keys and any other pertinent data, which may or may not be displayed.

The user then selects an account to review (Step S506) and the virtual software application calls the remote server (Step S506) and the Account Detail Module is downloaded and loaded into virtual memory in local computer 18 (Step S508). The Account Detail Module then calls data from the remote data server(s), a query is run at the remote data server to extract the pertinent data (Step S512). The data is then transferred to the local computer, loaded into the virtual software application and displayed (Step S514).

According to an embodiment of the present disclosure, the process changes for any subsequent entry in this section (e.g., Account Information 440) either to review an account previously displayed or to review a new account. That is, according to this embodiment, there are no longer calls to the remote application server for application modules because they remain memory resident in local computer 18 until the user exits the application.

The process for subsequent entries into the Account Information section will display the Account List Module (Step S516). The user selects an account for review (Step S518) and the Account Detail Module is displayed (Step S520). The Account Detail Module then makes a call to the remote data server (Step S522), a query is performed at the remote data server, and the list of accounts are downloaded into the Account List Module and displayed (Step S524).

Referring now to FIGS. 11A and 11B, it is assumed that the user selected the Transfer Funds 442 that was identified in FIG. 9. A call is made to the remote application server(s) (Step S600) and the Transfer Funds Module is downloaded and loaded into the virtual environment (e.g., RAM) in local computer 18 (Step S602). Upon completing the loading of the Transfer Funds Module, a call is made to the remote data server(s) and a list of the user's vendors is downloaded into the Transfer Funds Module and displayed (Step S604). According to this embodiment of the present disclosure, the Transfer Module includes the display and all processing sections for this part of the overall application. All Transfer Funds operations are completed from this module and the only calls to the data server(s) are performed, sending and receiving data (Step S606). After the Transfer Funds Module is loaded into the virtual environment and the initial data transfers are completed (Step S606), the application waits for the user interaction. The user can select an account to move funds from, an account to transfer funds to and an amount to be transferred (Step S608) by clicking on a corresponding button displayed on the screen. The reset option (Step S610) is executed by clicking on a reset button. The button initiates a function to place null or zero values in each of the input fields on the screen (Step S612) and then the application waits for user interaction.

The user can select accounts and amount to be transferred or return to the Main Menu (FIG. 9). If the user selects accounts and an amount to be transferred and clicks on the transfer funds button (Step S614), a call is performed sending the user data to the remote data server for processing (Step S616). At the remote data server the data is received, the data is queried and the funds are transferred from one account to another. The transfer can be immediate or scheduled for processing in the banks next batch process. After the processing is complete the results of the processing are returned to the local computer, loaded into the virtual software application and displayed on the screen (Step S618). The user can then return to the Main Menu or return to the payment screen.

On any subsequent entry into this section of the application (e.g., Transfer Funds 442), during this session, the Transfer Funds module is displayed (Step S620) and at the Select Account Input Data screen the account information is input. Steps S624-S632 are similar to corresponding steps S610-S618 and for brevity, will not be described in detail.

Referring to FIG. 12, it is assumed that the user selected the Pay Bills Online (446) that was identified in FIG. 9. A call is made to the remote application server(s) (Step S700) and the Pay Bills Online Module is downloaded and loaded into the virtual environment in local computer (Step S702). Upon completing the loading of the Pay Bills Online Module, a call is made to the remote data server(s) and a list of the user's vendors is downloaded into the Pay Bills Online Module and displayed (Step S704). According to this embodiment of the present disclosure, the Pay Bills Online Module includes the display and all processing sections for this part of the overall application. All Pay Bills Online operations are completed from this module and the only calls to the remote data server(s) are performed, sending and receiving data.

After the Pay Bills Online Module is loaded into the virtual environment and the initial data transfers are completed, the application waits for the user interaction. The user can select a vendor and input the amount of the payment and/or add a new vendor.

To make a payment, the user can select a vendor (Step S706), input the amount of the payment, date for payment to be made and the frequency of the payment (Step S708). The user then clicks on the process payment button and a call is made to the remote data server sending the payment information for processing (Step S710).

The data is received at the data server. The data is queried to add the payment and perform any additional payment processes in the database (e.g., scheduling payment to be processed). After the processing is complete, the results of the processing are returned to the local computer, loaded into the virtual software application and displayed on the screen. The user can then return to the Main Menu or return to the payment screen.

If the user needs to add a new vendor for payment, the user clicks on a "New Vendor" button displayed on the screen and a New Vendor screen is displayed (Step S712). The user inputs the information related to the vendor such as name, address and account number (Step S714) and enters the payment amount (Step S716). The user then clicks the add vendor button and a call is made to the remote data server sending the vendor information (Step S718).

At the remote data server the data is received, verified, error checked and added to the database or rejected. The results of the data processing at the remote data server are completed and data is returned to the local computer for display on the initial screen for this module and waits for user interaction.

On any subsequent entry into this section of the application, during this session, the Pay Bills Online module is displayed at the initial screen (Step S720). Then all subsequent processing is the same as the first entry above. That is, Steps S722-S732 are similar to Steps S706-S718 and for brevity, will not be described.

To provide a high level of security, upon the user logging out of the system or otherwise leaving the session (e.g., shutting the local computer down), the RAM in local computer 18 may be erased by overwriting the areas that stored the virtual environment utilized by embodiments of the present disclosure with all zeros, all ones, random data, etc. Where such a high level of security is not necessary, the RAM may simply be released for use by other applications on the local computer.

Using a product such as Flash development tool by Adobe as a development platform for implementing embodiments of the present disclosure, it is possible to make a URL on the Internet act as if it is an extension of the local computer storage components.

According to an embodiment of the present disclosure the Execution Module on the distributed medium is arranged to create and load into a virtual environment. As soon as the environment is created, the Execution Module makes a call to load the first operational module into the virtual environment.

An operational module according to aspects of the present disclosure is any application or part of an application that can be loaded into the virtual environment, via a call, load command, from the Execution Module or another operational module. The operational module may perform as a menu by calling other operational modules, or as a functional application making calls to the data server for information or as a combination of both.

On the local computer, the application operating in a virtual environment may encrypt data to be transferred. The application then sends the encrypted data to a URL identifying the data server(s).

The receiving process on the data server can be a web services connector, or a page on the Internet such as a .cfm page, .cfm is an extension for Coldfusion pages. In this embodiment of the present disclosure, Coldfusion has been selected for the server based processing because it is a natural fit with Flash, the development tool used to create embodiments of the present disclosure. Flash has the ability to interact with numerous Internet application protocols including, .php, .asp, .net, etc.

A call to a data server can include any or all of the following functions:
1. Un-encrypt the data sent by the application.
2. Perform queries to an ODBC compliant database. Queries can include extracting data, adding data or editing data.
3. Perform additional processing of the data
4. Encrypting the resulting data
5. Returning data to the application in the virtual environment on the local computer The virtual software application on the local computer then un-encrypts the data and displays the results for the user.

An implementation of embodiments of the present disclosure can utilize Adobe Flash software. Adobe Flash software is an authoring environment used to create rich, interactive content for digital, web and mobile platforms. Flash was initially designed as an animation tool. In the same way a traditional cartoon is filmed, Flash was designed to have layers placed over another with a view through all of the layers presenting the complete view. In the case of an animated cartoon, the base layer could be a blank sky blue screen. The next layer can have white clouds on it. When placed over the base level the white clouds are shown in the sky. The next level can be mountains and they block out the bottom of the blue background so looking through the three layers produces a mountain scene with blue sky and clouds. Each subsequent layer will add new elements to the movie and the elements will block out what is under it.

Flash can also be used for application design and works in a similar fashion. Layers of modules are placed on top of each other and as long as each module is added on a new layer, all of the other modules are available for display. The numbering scheme for these layers start with base layer 0 and several thousand layers can be placed above the base layer without having to remove any other module. If a module is loaded to a layer that already contains a module, the new module will replace the old module in the application.

In Virtual Software development, 0 is the base layer or the layer in which the "Startup" module is loaded. Each subsequent module is then layered above or below this layer. Layers do not need to be loaded using a sequential methodology. However, no two modules can share the same layer either. It is important to keep track of all module placement, since upon exiting, all layers should be "unloaded." That is, when a layer is unloaded, all data stored or displayed in the module is also removed from Flash. This becomes important for a medium that provides access to multiple applications. That is, to improve security, a user does not want to have data from one application floating around in the background and available to a different application.

According to an embodiment of the present disclosure, when constructing an application using Flash, the base or 0 level is populated with the "Startup" module and level 10 contains the "Logon" module. By standardizing these two modules, access to the data used by the application can be effectively controlled.

The following is a description of a methodology for implementing various aspects of the present disclosure. This description will assist in understanding the development process and the functionality of the present disclosure. Of course, it will be appreciated that the methods described herein are not the only methodologies that may be utilized for developing Virtual Software and is not intended to limit the claims or scope of the claims. This explanation is specific to development using Adobe Flash, but even within Flash this is not the only way to develop an application. There are nuances to the development of any application, which have the ability to take the process down different paths. This explanation is therefore intended as a guide to development rather than a rigid set of rules.

The process of creating a virtual software application environment can be implemented in various ways. Almost any software application that currently runs in a browser window can be converted to run in a virtual software environment. Two salient features of a virtual software environment according to an embodiment of the present disclosure are key recognition and loading of the Logon screen. These two steps grant access and manage the data. The issue of data management can become particularly important when a single distributed medium is used for granting access to multiple institutions.

For additional security, various systems can be used. For example, embodiments of the present disclosure can use standard SSL using windows crypto API. For even greater level of security, embodiments can be implemented in conjunction with encrypted chip technology on the medium. The level of security to be employed can be changed depending on the particular needs of the user. In this way, each application can be custom designed to the user's specifications.

Key recognition may be an important part of the security process according to various aspects of the present disclosure. Key recognition allows the medium (e.g., smart card) to access a particular institution's application and data or shuts the medium down completely if the Key is not recognized. The institution can maintain their own Key database or the Key database can be controlled by an outside service. The benefit of allowing an outside service to control the Key database is that a consumer then has the ability to cross reference a Key to multiple accounts. For example, a consumer may receive a medium from multiple sources such as from their Financial Institution, Health Insurance provider, Pension Plans and Investment Management Service, etc. The outside service can provide a cross-reference process, so that any one of these Keys can provide access to all of the consumer's accounts. If any of these distributed medium Keys are lost, that key can be disabled but any of the other keys will still provide access to each of the other accounts that have been cross-referenced.

Aspects of the present disclosure are described by reference to the use of a flash drive as the distribution medium. Of course, it will be appreciated that the use of a flash drive is non-limiting and aspects of the present disclosure can be practiced utilizing other types of distribution medium.

The following is a description of some of the applications or modules used for performing processes that may be used to implement various aspects of the present disclosure According to an embodiment of the present disclosure, a "Startup" application is provided in the distribution medium. Key recognition is completed in the "Startup" application distributed in the distribution medium. The "Startup" application performs several functions including creating the environment for the application to operate, providing the URLs to the Key database and the "Logon" module, connecting to the database using a WEB Services Connector or through a standard call to a URL, verifying Key validity performed at the server level and loading the "Logon" module.

The medium and the "Startup" application provided on the medium contain little data of value. However, even if the medium gets lost or stolen, there is very little realistic chance of the medium being reverse engineered or decompiled. The Key can be provided through an encrypted chip with security related to the chip provided by a third party currently providing these chips to the market. Although theoretically the encrypted chip can literally be sanded down one layer at a time to expose the key number, this process is sophisticated and requires sophisticated electronic equipment and techniques. In any event, even in the unlikely situation that the encrypted chip is compromised, the only exposure is to a single medium and accounts associated with it. According to an aspect of the present disclosure, if a medium is reported lost, the key can be marked as inactive on the server and the compromised key rendered useless. According to an embodiment of the present disclosure, an inactive response to a Key query can even cause the encrypted chip to self-destruct.

If for some reason the "Startup" application itself is compromised, the only data a hacker will have available is the URLs for the key database and the URL used to load the "Logon" module. The client's data and application locations are not compromised. This is assured due to the "Logon" module's design. The "Logon" module contains the URL's for the remaining application modules and the database(s).

As noted above, the Key is either active or not active. Depending on the level of security desired, if it is determined during verification that the Key is not active, the chip and associated circuitry on the medium can be designed so that it has the ability to cause the chip to "blow itself up" and/or provide a message stating that the Key is no longer valid. For a medium with a destroyed chip there will never be a reason to verify the Key again. The cross reference database can be modified to remove that Key. If a party again attempts to use the distributed medium, and the "Startup" application again tests a read of that key from the chip, a message stating that the KEY is not active can be displayed without making a call to the database.

If the key is active, after a successful key verification, the "Startup" application loads a "Logon" module and transfers all control to the "Logon" module. According to an embodiment of the present disclosure, this can be done by making the last function executed in the "Startup" application the loading of the "Logon" module.

The "Logon" module is a salient feature for various aspects of the virtual software utilized by various embodiments of the present disclosure. The "Logon" module provides a process for further verifying that the holder of the distributed medium having the Key is the authorized user. The User Name and Password used during logon, functions the same as any online application but transfers one additional piece of data, the encrypted key. On the remote server side, the remote server verifies that the User Name, Password and Key combination are correct. If any of this three field combination is incorrect, the process returns an "Invalid User" message to the "Logon" module at the local computer which is displayed to the user. This insures that the person holding the key is the true owner or at the very least has the true owner's logon information along with their Key.

An institution can add additional parameter checks for access control during the logon process. The desire here is to eliminate user access to sections of the overall software that are not within the scope of the user's authority. By performing a parameter check at this level, the client can eliminate the need to download modules and increase security. An example of this level of security is an automobile company (e.g., the institution) providing access to plans and schematics to manufacture a vehicle. The institution wants to provide access to data to subcontractors, but only wants the subcontractors to have access to the data necessary to complete their work, not the data for the entire automobile. Parameters can be set to limit the data access available to each subcontractor.

Assuming that the Key is valid and the logon information is correct, the application will then load the next logical module. According to an embodiment of the present disclosure, the next module loaded is a "Control" module. According to this embodiment, the control module displays a group of buttons/links to available processes and/or it may provide additional display information.

According to an embodiment of the present disclosure, one of the modules is selected and is always used as a depository for data with no exceptions. For example, according to this embodiment, the "Logon" module is always used as the depository for data. The process for populating and retaining data is module specific. That is, so long as the module is loaded the data is available to any other module currently loaded in the application. Upon unloading the "Logon" module, all data is flushed from memory and is no longer available to the remainder of the application or to any subsequent application.

According to an embodiment of the present disclosure, the flush of data from memory by unloading the "Logon" module, removes access to all data both displayed and used for processing. According to another embodiment, unloading the "Logon" module removes access to all data displayed and used for processing except for data stored in display fields in the other application modules. According to an embodiment of the present disclosure, an "Exit Function" is provided in the "Control" module. Every time data is loaded, an entry is written into this function to unload that layer. When the exit function is executed, each layer containing data will be unloaded and any data displayed in those modules will also be unloaded. The system executes the module unload for each level of the application. Commands to unload unpopulated levels are ignored.

The following description applies to an embodiment of the present disclosure implementing an example of a banking institution's requirements According to an embodiment of the present disclosure, a "Control" module is the first module loaded after the logon is complete. The "Control" module displays buttons along the left side of the screen, each button corresponding to a module of the application or function. These buttons interact with the other modules of the application. Clicking one of these buttons either loads the module (if not already loaded) or displays the module (if already loaded.)

According to an embodiment, an "Account" module is the next module loaded immediately following the control module and can be loaded without user interaction. The "Account" module displays tabs across the top of the account screen. Each tab functions like the buttons in the "Control" module. That is, selecting a tab will either load a module (if not already loaded) or display a module if it has been previously loaded. The tab that is currently selected will be a different color than the other tabs.

An "Account Info" module is the next module loaded and can also be loaded without user interaction. This module displays a list of accounts available through this institution. For example, if the institution is a financial institution such as a bank, a list of the user's accounts with that bank will be displayed. The list is populated with data queried and loaded into the logon module after the user logon was successful. When a user clicks on an account, a function is called that sends the account key selected to the server, the server then process a query to select all account detail related to the key within a range of dates. The results are then returned to the application and stored in the "Logon" module. When the results are returned, the application hides the "Account Info" module and loads or un-hides an "Account Detail" module and loads the results from the query for display into the "Account Detail" module.

An "Account Detail" module is loaded on demand of the user. When the user clicks on an account in the "Account Information" module, a function in the "Logon" module is executed to query the banks database of a list of transactions related to the account. An account key variable is passed to the "Logon" module function to identify the account to be queried. The "Logon" module then runs the query process and when the results are returned from the server, the Account Detail module is then loaded or displayed and the results of the query are displayed. In this module, the display is a text box attached to a scroll bar. The box has tabs set to assure the data lines up, and the query results are loaded one line at a time. According to an embodiment of the present disclosure, a button can be displayed that when clicked will display checks if check images are stored related to the transaction.

A "Transfer" module is loaded or displayed as a result of clicking on the "Transfer Funds" button in the "Account" or "Control" modules. This module has two drop-down, combo, boxes that are populated with a list of the consumer's accounts and their balances for selection. The consumer selects a "From" account and a "To" account, then inputs the amount to be transferred, the date of the transfer and the frequency of the transfer. Then by clicking on the accept button the data is sent to the remote server and stored for nightly batch processing by the bank.

The "Pay Bills" module is loaded or displayed as a result of clicking on the "Pay Bills" button in the "Account" or "Control" module. This module allows the user to add vendors to the user's account database, allows the user to set up bill payment amounts and the payment date. The user can specify a date for payment or a frequency of the payment, for example, weekly or monthly. These payments can be processed by the payee in the nightly batch.

The batch processing for the bank would likely already be in place and are not effected by the changes in interaction by the consumer using this embodiment of the present disclosure and therefore will not be discussed.

A "Customer Support" module is loaded or displayed as a result of clicking on the "Customer Support" button in the "Account" or "Control" module. The "Customer Support" module provides access to text information for the consumer. The "Customer Support" module provides a text box with a scroll bar along the right of the box to display data too large to fit in the box. This box can be populated with data based on the button selected. This eliminates the need to load multiple pages or modules.

Various aspects of the present disclosure can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the present disclosure can be performed by one or more programmable processors executing a computer program to perform functions of the disclosure by operating on input data and generating output. Method steps can also be performed by, an apparatus of the disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, aspects of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Aspects of the present disclosure can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the present disclosure, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The present disclosure has been described in terms of particular embodiments. Other embodiments are within the scope of the following claims. For example, although the present system has been described as a component in a larger system, it can also be implemented in other systems or as a stand-alone system.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

Multiple User Authorization

All the methodologies and embodiments described above can also be applied to the design and construction of multi-user virtual software applications. A multi-user virtual software application expands the area of the logon process and the ability to have a multi-user requirement for accessing secure application and data.

The multi-user authorization methodology maintains the process described above of using a uniquely serialized distributed medium that can connect to a local computer. The local computer must have an active Internet connection and a connection port, such as a USB port. Both parties must be granted logon authority for the multi-user application and both parties must logon within an allotted time.

Figure 13:
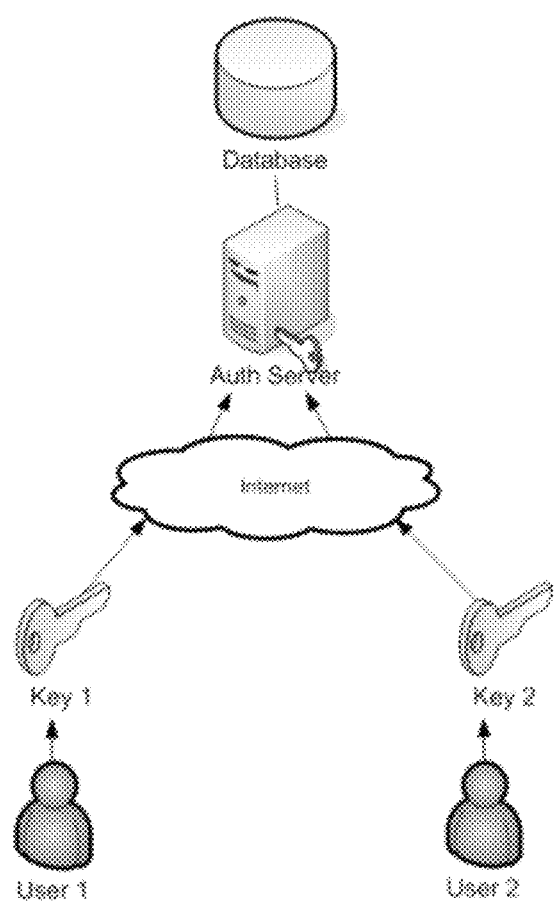
FIG. 13 illustrates two users each using a distributable medium to access the authorization server through the Internet.

The process for connecting to the Internet to access a multi-user virtual software application consists of two or more users being identified and authorized in order to access secure non-browser based application modules and through the application, access secure data. In FIG. 13, each user uses a distributable medium to access the authorization service through the Internet. The authorization server verifies the unique serialized identifier on the medium ID authorized for access. The authorization server queries the database using the unique ID from the medium to select the validation value and application path.

There are three potential values for authorization: 1—valid; 2—invalid; and 3—self-destruct. If the returned value is invalid, the authorization server returns a message to contact a system administrator to resolve the issue. If the response is self-destruct, the return value starts a process on the device to self-destruct if this option is deployed. If the returned value is valid, the path to the non-browser based logon module is provided and the module is loaded into the environment, as described above.

Figure 14:
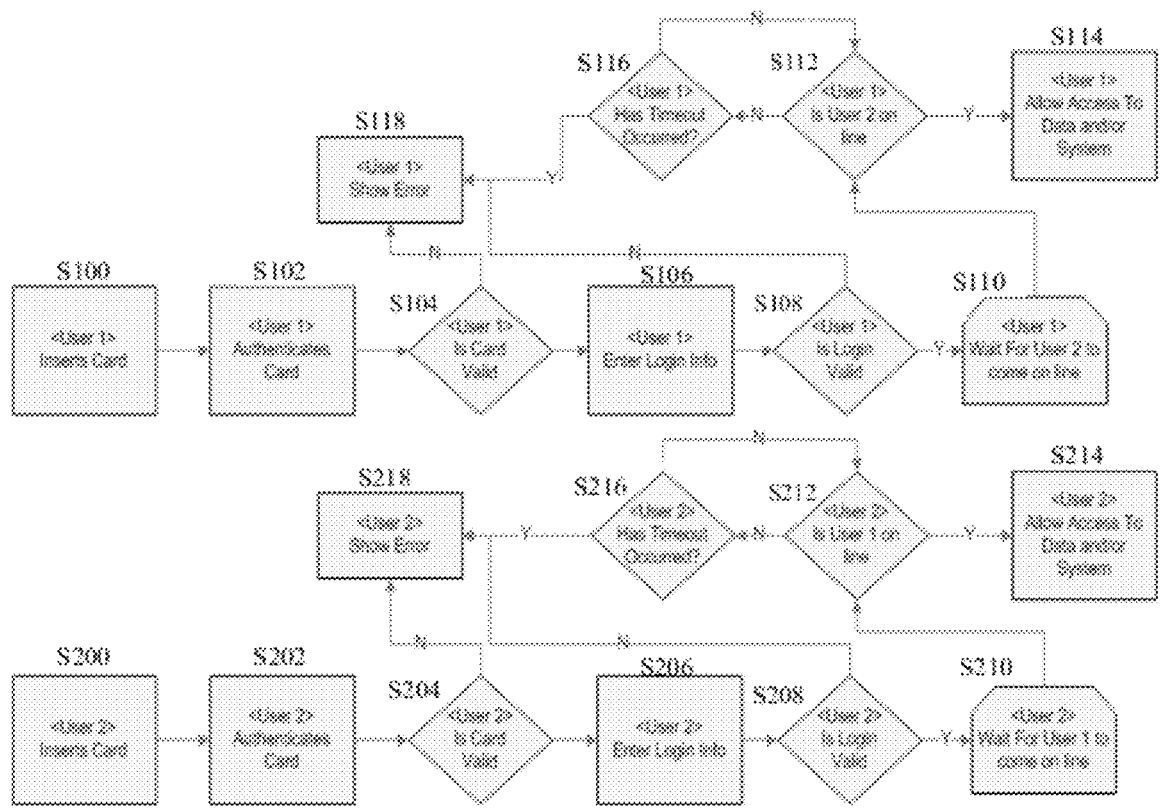
FIG. 14 illustrates a flow chart for the logon process based on two-user authorization.

FIG. 14 provides an illustration of one embodiment of the logon process based on two-user authorization. In other embodiments of the invention, the process is not limited to only two-user authorization and can be used for any number of users. The process for access for each of the additional users is identical for each user in a multi-user environment. The process for user 1 as described below is thus identical for each additional user that may be required to provide access authorization in a multi-user environment.

In FIG. 14, the first user, user 1, connects their distributable medium to a local computer that has an active Internet connection S100. A distributable medium may be any device that contains a uniquely serialized chip that can be connected to a local human interface device, computer, and provides identification of the user to an authorization server, FIG. 1, and then validates the number prior to the construction of a virtual software application. This medium may be independent of the human interface device or may be permanently connected to the device for added security.

The connected device can either auto execute script to being the verification process, if the device is portable, or user action can be required by opening the device and executing the verification process by executing a file on the device.

The execution process sets up a virtual environment that exists only in RAM, sets up an encrypted communication tunnel, and then verifies that the serialized number on the device is valid S102. This process is described above.

If the device is valid S104, the validation server returns the path to the logon module and then transfers control to the application server(s). The application server(s) can deliver non-browser based application modules directly to a local computer or can serve them through verification servers. As described herein, a browser may be any installed application that is intended to provide access to web pages and web-based processes.

Once the logon module is loaded into the virtual environment, the process pauses and waits for user interaction. The user is then required to enter their User Name and Password to gain access S106. In a multi-user authorization environment, the logon module will validate the user's accreditation S108 and then seek cross-referenced users to provide authorization S110.

The application waits until the additional user(s) log into their non-browser based logon module. Once the additional user(s) logs into their non-browser based logon module S112, the users are coupled and the users can cross authorize an additional user to grant access to the remaining non-browser based application modules S114.

If multiple users can authorize access to a user, a list of current online users will be listed for the first user, user 1, to request access authorization. User 1 selects an authorization partner and the additional user is prompted to grant access to user 1. If no authorization partner is currently available, User 1 waits for a secondary user to log on. That user will see that User 1 is waiting for authorization and can select User 1 as an authorization partner. Then User 1 is prompted to accept the coupling and grant access to both users.

If the secondary authorized user, User 2, is not online, the logon module for User 1 begins a process timer that will check on the secondary authorization until provided. After a certain period of time, the virtual security application will time out, the logon module will end its connection to the verification server(s), reset all application modules and stored variables to null, unload the logon module, and then close the virtual environment S116, S118.

In one embodiment of the invention, based on role-based credentials, the application process can require both users to load the same application modules and view the same data concurrently and provide edit capabilities to either or both users. In another embodiment of the invention, the process may also provide for both users to operate independently with either user viewing or accessing modules or data independently. The invention pertains to any combination of these two embodiments or any logical extension of these embodiments.

In the embodiment wherein both User 1 and User 2 must log on at the same time, FIG. 14 illustrates the process for user 2 to log on. The process identical to the process for user 1 as described above.

As described above, all non-browser based application modules are loaded based on stored accreditation and upon completion of the user's interaction with the application. Upon completion of processing, all data is overwritten and is set to null and then all application modules are flushed from RAM, leaving no footprint on the local computer.

All modules are changes at the server. This invention eliminates the need to download any upgrade to the device or the local computer. There are no application modules or data stored on the distributable medium or installed on a local computer. Therefore, any changes to an application module made at the server are deployed immediately to all users without the need for any local upgrade processing.

The base module for each virtual security application contains a listing of all available module and query versions. Any change to a version while an application is in use will trigger an out of synchronization message and will require the user to log out of the virtual security application log back in, thereby bringing the virtual security application into sync with the current processing.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for providing internet security via multiple user authorization comprising:
    providing to each of two users a non-transitory tangible storage medium including a non-browser based access application module for providing access to at least one remote server;
    in response to a first user inputting the non-transitory tangible storage medium onto a local computer, loading the non-browser based access application module into virtual memory and executing the non-browser based access application module and downloading a remote non-browser based access module from the at least one remote server;
    loading the remote non-browser based access module into virtual memory on the local computer and providing an access screen to first user, the access screen prompting the first user to input remote logon data for access to at least one remote data server;
    inputting the remote logon data for the first user;
    if the first user's remote logon data is valid, waiting for a second user to input the second user's non-transitory tangible storage medium into a local computer and for validation of the second user's remote logon data;
    if the second user's remote logon data is valid, waiting for the second user to grant authorization to the first user to access the remaining non-browser based application modules;
    if authorization is granted, loading the at least one additional non-browser based application module into virtual memory of the first user's local computer;
    executing the at least one additional non-browser based application module; and
    displaying the at least one of a data display screen and navigation screen to the first user.

2. The method of claim 1, wherein if authorization to the first user is granted, the additional non-browser based application module is loaded into virtual memory of both of the first user and the second user's local computers.

3. The method of claim 2, wherein if either of the first user or the second user exits the additional non-browser based application module, the other user is automatically exited from the application.

4. The method of claim 1, wherein if the second user does not authorize the first user within a specific period of time, the first user's access module will disconnect from the remote server.

5. The method of claim 1, wherein the non-transitory tangible storage medium is provided to any number of additional users.

6. The method of claim 5, wherein authorization of the first user may be granted by any of the additional users.

7. The method of claim 6, wherein the first user may select from a list of the second user and any of the additional users to grant authorization.

8. A distributed non-transitory tangible recording medium including computer executable code for providing secure access to at least one of remote applications and remote data, the distributed non-transitory tangible recording medium including a first computer executable non-browser based access application module comprising:

code for loading the first computer executable non-browser based access application module into virtual memory on a local computer in response to a first user inputting the non-transitory tangible storage medium onto a local computer;

code for accessing at least one remote server at a predetermined URL;

code for requesting that at least one remote server at the predetermined URL download at least one of a second executable remote non-browser based access application module and data to the local computer;

code for loading the at least one of the second executable remote non-browser based access application module and data into virtual memory on the local computer;

code for confirming authorization of the first user by a second user and loading the at least one additional non-browser based application module and data into virtual memory on the local computer.

9. The distributed non-transitory tangible recording medium of claim 8, wherein the non-transitory tangible recording medium comprises at least one of a CD-ROM, Flash Drive, Memory Chip, and Flash Memory.

10. The distributed non-transitory tangible recording medium of claim 8, wherein the non-transitory tangible recording medium comprises at least one of a magnetically and optically recorded medium.

* * * * *